US012636614B2

(12) United States Patent
Trainoff et al.

(10) Patent No.: US 12,636,614 B2
(45) Date of Patent: May 26, 2026

(54) ELECTRICAL FIELD FLOW FRACTIONATOR

(71) Applicant: Wyatt Technology, LLC, Goleta, CA (US)

(72) Inventors: Steven P. Trainoff, Santa Barbara, CA (US); Kyle Ellis, Huntington Beach, CA (US)

(73) Assignee: Wyatt Technology, LLC, Goleta, CA (US)

( * ) Notice: Subject to any disclaimer, the term of this patent is extended or adjusted under 35 U.S.C. 154(b) by 1170 days.

(21) Appl. No.: 17/505,618

(22) Filed: Oct. 19, 2021

(65) Prior Publication Data

US 2022/0118407 A1 Apr. 21, 2022

Related U.S. Application Data

(60) Provisional application No. 63/093,764, filed on Oct. 19, 2020.

(51) Int. Cl.
*G01N 30/00* (2006.01)
*B01D 57/02* (2006.01)
*B03C 5/02* (2006.01)

(52) U.S. Cl.
CPC ............... *B01D 57/02* (2013.01); *B03C 5/02* (2013.01); *G01N 30/0005* (2013.01)

(58) Field of Classification Search
CPC G01N 30/0005; B01D 57/02; B03C 2201/02; B03C 11/00
See application file for complete search history.

(56) References Cited

U.S. PATENT DOCUMENTS

| | | | | |
|---|---|---|---|---|
| 2,156,914 A | * | 5/1939 | Williams | ................ C22C 38/40 |
| | | | | 138/177 |
| 5,133,844 A | * | 7/1992 | Stevens | .................... B03B 5/00 |
| | | | | 204/549 |
| 6,136,171 A | | 10/2000 | Frazier et al. | |
| 6,180,906 B1 | * | 1/2001 | Trainoff | ............. G01N 30/0005 |
| | | | | 209/127.1 |
| 8,298,394 B2 | | 10/2012 | Moon et al. | |
| 2002/0023842 A1 | | 2/2002 | Ogle | |
| 2010/0213049 A1 | * | 8/2010 | Burtch | ....................... C25B 1/02 |
| | | | | 204/242 |
| 2011/0290724 A1 | * | 12/2011 | Wyatt | ................ G01N 30/0005 |
| | | | | 210/101 |

(Continued)

FOREIGN PATENT DOCUMENTS

EP 1879025 B1 10/2013

OTHER PUBLICATIONS

Johann et al., Anal. Chem. 2015, 87, 4292-4298 (Year: 2015).*

(Continued)

*Primary Examiner* — Luan V Van
(74) *Attorney, Agent, or Firm* — Schmeiser, Olsen & Watts LLP

(57) ABSTRACT

The present disclosure describes a field flow fractionator including (a) a top plate assembly including a top electrically conductive electrode, (b) an o-ring, (c) an electrically insulating frit, (d) an electrically insulating spacer between a bottom surface of the top electrode and the o-ring and the frit, (e) a membrane between the spacer and the frit, and (f) a bottom plate assembly including a bottom electrically conductive electrode.

23 Claims, 12 Drawing Sheets

(56)            References Cited

U.S. PATENT DOCUMENTS

| | | |
|---|---|---|
| 2012/0171871 A1 | 7/2012 | Dhindsa |
| 2012/0234731 A1* | 9/2012 | Senftleber ............... B03C 1/288 |
| | | 209/39 |
| 2020/0049671 A1 | 2/2020 | Trainoff |
| 2020/0408726 A1 | 12/2020 | Trainoff et al. |

OTHER PUBLICATIONS

International Preliminary Report on Patentability in PCT/US2022/047190 mailed on May 2, 2024.
International Search Report and Written Opinion in PCT/US2022/047190 mailed on Jan. 20, 2023.
Extended Search Report in European Patent Application No. 22884440.3 mailed on Jul. 2, 2025.
Sim, et al. "A review of fouling indices and monitoring techniques for reverse osmosis" Desalination, No. 434, Dec. 2017, pp. 169-188.

* cited by examiner

ELECTRICAL FIELD FLOW FRACTIONATOR

PRIORITY

This application claims priority to U.S. Provisional Patent Application No. 63/093,764, filed Oct. 19, 2020.

BACKGROUND

The present disclosure relates to field flow fractionators, and more specifically, to a an electrical field flow fractionator.

SUMMARY

The present disclosure describes a field flow fractionator including (a) a top plate assembly including a top electrically conductive electrode, (b) an o-ring, (c) an electrically insulating frit, (d) an electrically insulating spacer between a bottom surface of the top electrode and the o-ring and the frit, (e) a membrane between the spacer and the frit, and (f) a bottom plate assembly including a bottom electrically conductive electrode.

DETAILED DESCRIPTION

Figure 1A:
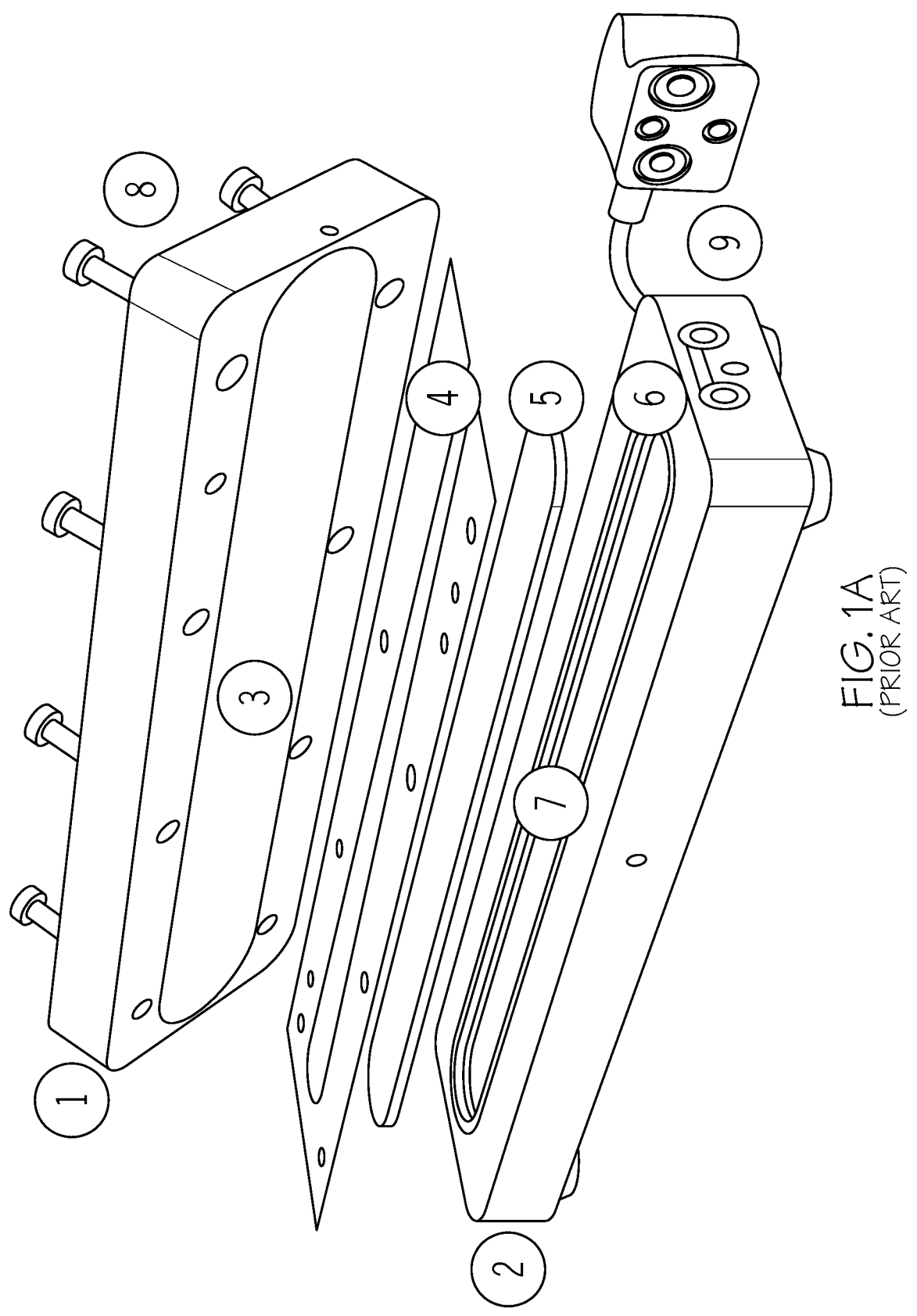
FIG. 1A depicts an apparatus in accordance with an existing field flow fractionator.

The present disclosure describes a field flow fractionator including (a) a top plate assembly including a top electrically conductive electrode, (b) an o-ring, (c) an electrically insulating frit, (d) an electrically insulating spacer between a bottom surface of the top electrode and the o-ring and the frit, (e) a membrane between the spacer and the frit, and (f) a bottom plate assembly including a bottom electrically conductive electrode.

The heart of the design is to eliminate the polymer frame and make the electrodes into the entire channel. Since the voltages never exceed +−30V and the current +−30 mA, there are no safety issues associated with having the conducting surfaces exposed. The second major design change is to eliminate stainless steel as a wetted material. One could imagine making the entire assembly out of solid blocks of platinum, but that would be prohibitively expensive. A more cost effective solution is to make the top and bottom electrodes out of Titanium that is plated with Platinum. The substrate is made of Titanium, which self-passivates. Exposed metallic Ti oxidizes to TiO2, which is an insulator. Very rapidly, all of the exposed Ti is encapsulated by a TiO2 layer, leaving only the Pt coating in contact with the sample and mobile phase. One can accelerate the passivation process after coating by simply soaking the Pt plated Ti electrodes in a strong oxidizing solution such as concentrated hydrogen peroxide $H_2O_2$. This will not affect the metallic Pt, but grows a thick layer of TiO2.

The top plate is electrically isolated from the bottom plate by using an o-ring and non-conducting frit. The o-ring is retained with a non-conductive backing plate. Finally the top block is bolted directly into the bottom block but is electrically isolated by a series of insulating washers. To reassemble the electrical FFF, one places a membrane on the ceramic frit, places the channel spacer on the alignment pins, and then bolts the top electrode on.

An addition benefit of the electrical FFF is that the entire assembly is made of good thermal conductors. It is highly desirable to run the mobility experiment at constant temperature because a change in temperature will result in a change in the viscosity of the mobile phase, which will also cause a change in the peak elution time. If the temperature is not held constant, peak shifts due to poor thermal regulation will be confused with peak shifts due to the applied electrical field, reducing the accuracy of measured electrophoretic mobility. The electrical FFF could have a temperature-regulated stage bolted underneath. The stage has a temperature sensor and a heater that holds the assembly a few degrees above room temperature. Since the entire channel is in good thermal contract with the temperature-regulated stage, the temperature of the fluid in the channel is precisely controlled.

The field flow fractionator could be corrosion resistance, mechanically robust, and cost effective to manufacture. Additionally by being constructed almost entirely out of high conductivity materials, the field flow fractionator could be easy to thermally regulate.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Field flow fractionation is a broad class of molecule and particle separation techniques that apply a field perpendicular to a thin channel. The field creates a flux that drives the sample towards an accumulation wall causing it to concentrate near the wall. Diffusion creates a countervailing flux away from the accumulation wall. When equilibrated, the sample reaches a concentration profile that is highest at the wall and drops exponentially away from the surface.

The Flow FFF subtechnique uses a semipermeable membrane as the accumulation wall so that the carrier solvent can pass through the membrane, but the sample cannot. Large particles within the sample feel a large Stokes force pushing them towards the membrane and a relatively small diffusion flux in the opposite direction. The gives rise to a small exponential decay length than that formed the small particles in the sample. In other words large particles are closer to the accumulation wall on average than small particles. Then an additional channel flow is applied along the channel, perpendicular to the field. The zero velocity boundary condition at the surface of the channel creates a shear where flow along the channel is zero on the wall, and increases as one moves further into the bulk. This means small particles, which are on average further from the accumulation wall move downstream more rapidly than the large particles. At the end of the channel, the sample is collected and sent through a series of analytical instruments to characterize the sample. If one injects an unfractionated sample at the entrance of the channel, the sample elutes fractionated at the exit with the small particles eluting first followed by progressively large particles.

Symmetric Flow Cross Flow Fractionator (SFlFFF)

As an illustration of the separation of particles by field flow fractionation, a simplification of perhaps the most straightforward system, a SFlFFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SFlFFF. An A4F channel assembly may include (1) a bottom assembly structure holding a liquid-permeable frit surrounded by a sealing O-ring, (2) a permeable membrane that lies on frit, (3) a spacer of thickness from about 75 $\mu$m to 800 $\mu$m into which has been cut a cavity, and (4) a top assembly structure generally holding a transparent plate of polycarbonate material or glass. In Asymmetric flow field flow fractionation (AF4), the field that drives the sample to the accumulation wall is the Stokes force from flow through the membrane.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in spacer 110 serves as the channel in which separation will occur. The top assembly structure 140 usually contains three holes, called ports, that pass through the top plate 110 and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Electrical A4F

In Electrical AF4, an additional field is applied that modifies the standard AF4 fractionation. The additional field is an electrical field that is applied to the channel by placing one conducting electrode on the top of the channel and a second electrode below the membrane. Then an electrical current is applied. The resulting field E felt by the particles in units of Volts/meter is $E=I/(\sigma A)$, where I is the applied current in Amperes, $\sigma$ is the solvent conductivity in Siemens/meter, and A is the channel area in meters$^2$. The electric field acts on the charged particles to generate an additional force that modifies the Stokes force from the flow. Since both the applied field and the sample charge can be of either sign, the electrical field can act in either in concert in opposition to the Stokes force. If the electrical field and the Stokes force are in the same direction, the particles are pressed more firmly against the accumulation wall, reducing the exponential decay length. The result is that the particles are retained in the channel longer than they would have in the absence of the field. If one runs multiple experiments with varying electrical field strength the shift in the peak arrival time is a measurement of the underlying molecular charge. This can be expressed as a zeta potential or an electrophoretic mobility.

To make a successful ElAF4 measurement there are several goals. First the channel must apply the field on the top of the channel and below the membrane. Second it must be chemically inert so that corrosion of the channel electrodes does not affect the measurement. Third it must be rigid enough to insure that the channel does not change shape or bulge under the influence of pressure. The last two point merits some discussion. Applying an electrical current through the channel not only creates the field that the particles feel, but they also induce electrochemical reactions at the interface. These reactions can corrode the electrodes themselves and they can electrolyze the solvent itself. Electrolysis of the solvent degrades the measurement in several ways. The reactive ions generated by electrolysis of salts in the mobile phase can change the pH and conductivity of the solvent. Reactive species generated on the electrodes can damage the sample itself, but one of the worst problems is that electrolysis of the solvent itself can evolve gas. If the mobile phase is aqueous, then hydrogen and oxygen gas will accumulate near the electrodes. This will change the local field, or in the worst case can insulate the electrode from the solvent entirely. To combat the deleterious effects of bubble formation, it is advantageous to operate the channel under pressure so that any gas generated by the current, will remain in solution and will pass out of the channel as part of the elution process. For example, if the channel is operated at 25 bar, than the solvent can carry 25× more gas in solution than if it was operated at atmospheric pressure. This allows one to apply larger field and create bigger peak shifts. Therefore it is highly desirable to operate at high pressure.

Current Technology

FIG. 1A depicts an existing electrical AF4. The top electrode 3, is held in an insulated block of PET polymer 1 with screws. Similarly bottom electrode 7, is screwed into a second PET block 2. An insulating frit 5 is put into a cavity in the bottom block assembly and the separation membrane is placed on the frit that acts as a support. The top block assembly is attached to the bottom block assembly with a series of screws 8 and interior of the channel is formed by a cut out in spacer 4. The spacer thickness sets the height of the separation channel. The spacer seals to the top assembly by clamping pressure and the bottom assembly seals to the spacer with o-ring 6. This construction insures that the top plate remains electrically isolated from the bottom block. The current is applied by connector 9 that contacts the electrodes on both the top and bottom blocks. The electrodes are made of polished stainless steel that has had a platinum coating applied.

Figure 1B:
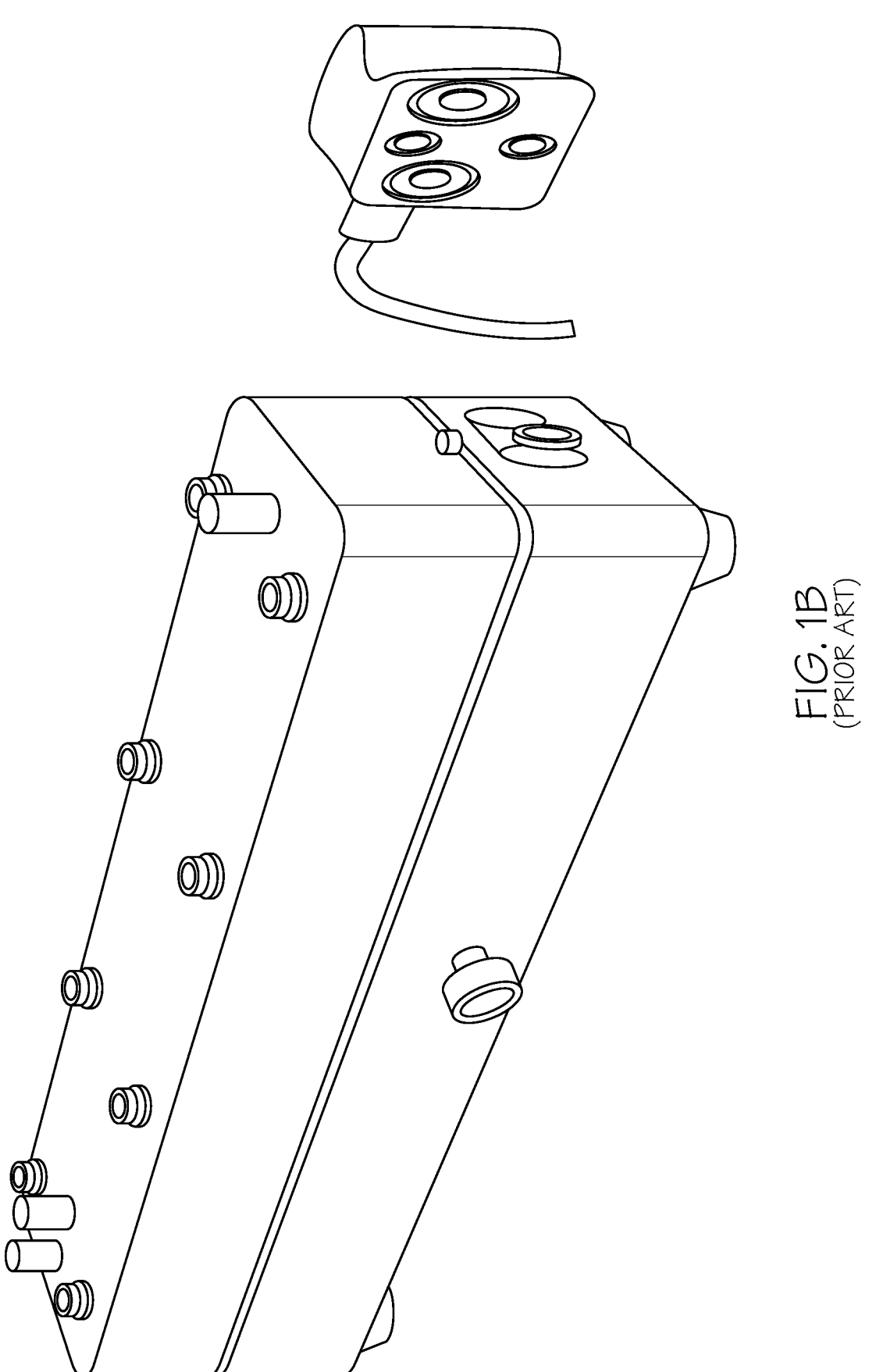
FIG. 1B depicts an apparatus in accordance with an existing field flow fractionator.

FIG. 1B shows the assembled channel and the fluid ports. The inlet, inject, and outlet ports seal to the top electrode and the fluid passes through holes in the electrodes to the channel.

Figure 1C:
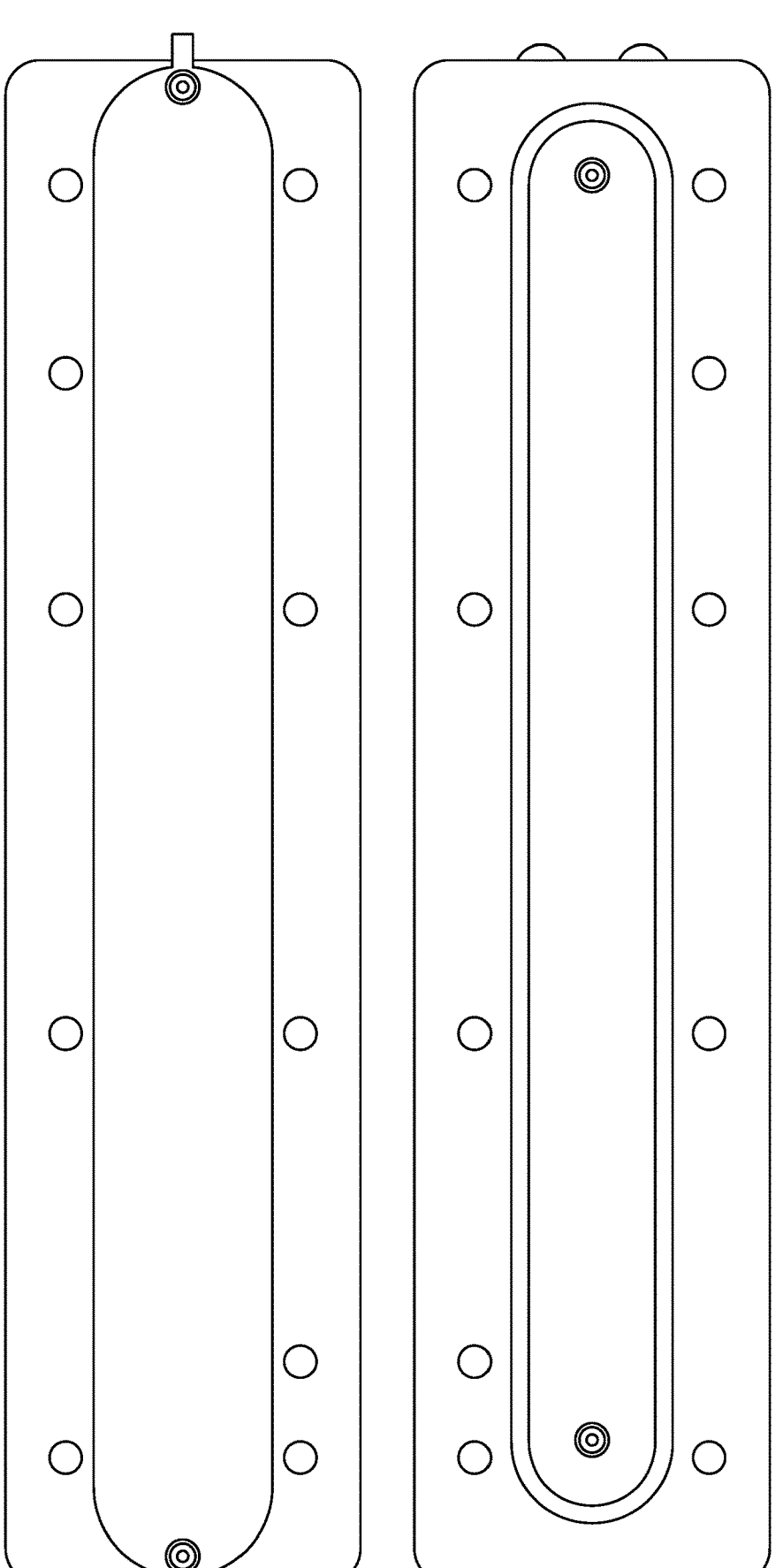
FIG. 1C depicts an apparatus in accordance with an existing field flow fractionator.
Figure 2:
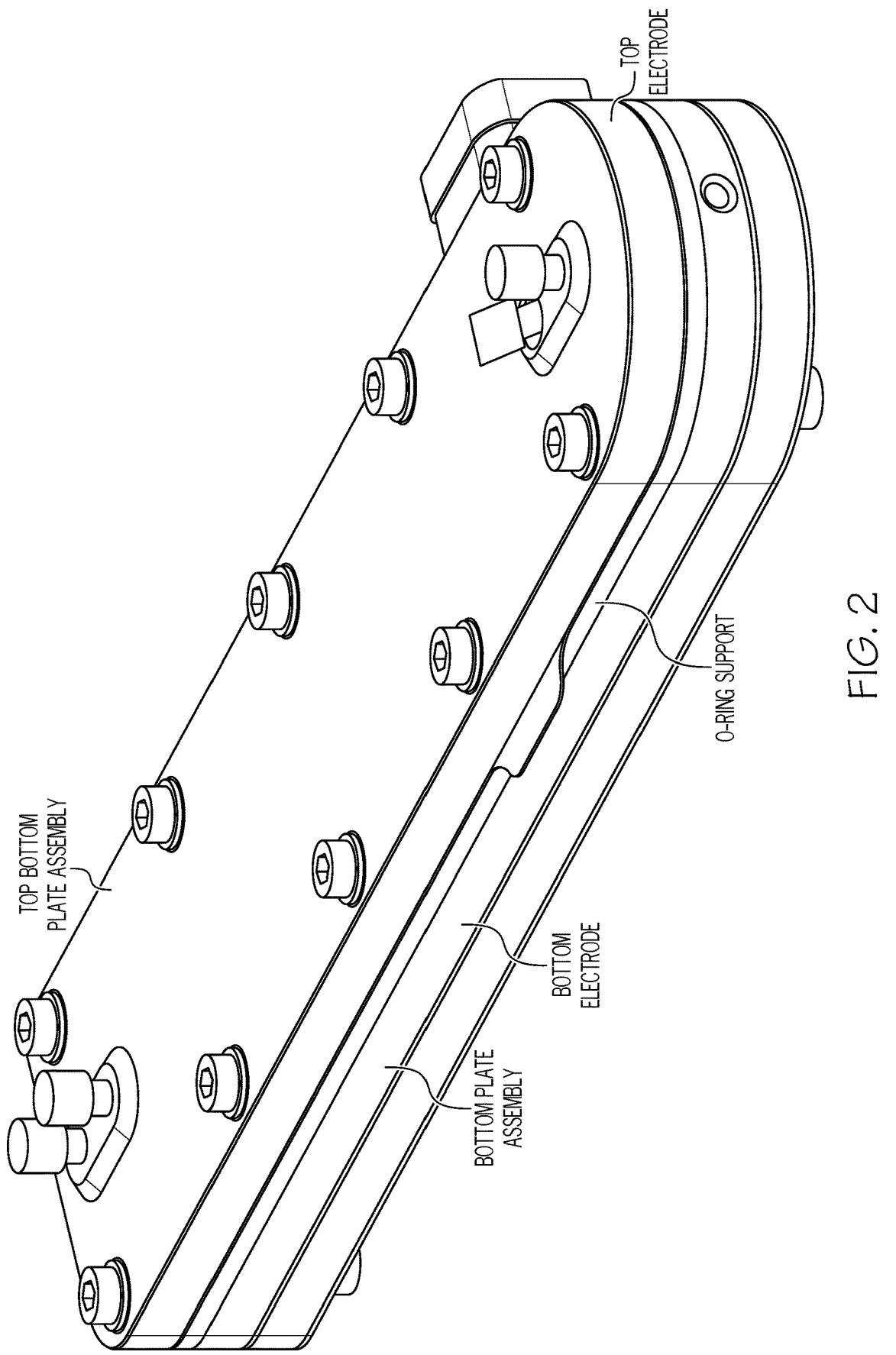
FIG. 2 depicts an apparatus in accordance with an exemplary embodiment.

The assembly depicted in FIG. 1A and FIG. 1B has a number of limitations. The first problem with this design is that the electrodes are made of platinized stainless steel. Electroplating processes are unable to coat the inside of holes, like the ones that bring the fluid into the channel. Moreover due to the polycrystalline structure of stainless steel and the lattice mismatch between platinum and stainless steel it is extremely difficult to get the platinum coating to fully encapsulate the stainless steel substrate. Typically even on well-plated surfaces there are microscopic cracks and pinholes that allow the underlying stainless steel to contact the fluid. And the fact that interior of the fluid ports are fully exposed means that the stainless steel is never fully encapsulated. When the current is applied the iron in the stainless can oxidize and eventually the plated surface is damaged. FIG. 1C depicts an example of an existing electrical AF4 after a few months of service.

Another problem with the existing electrical AF4 is that the electrodes are held in a PET polymer frame and the channel is sealed by a Mylar spacer. At pressures above 10 bar the assembly bows and at 15 bar it leaks badly to the room. Also, the existing electrical AF4 is mounted in thermally (and electrically) insulating blocks. The only way it could be held thermally stable is by putting the entire assembly inside an oven which, while effective, is bulky and expensive. Thus, there is a need for an electrical field flow fractionator, that resolves these problems and improves the performance Referring to FIG. 2, FIG. 3A, FIG. 3B, FIG. 3C, and FIG. 3D, in an exemplary embodiment, the field flow fractionator includes (a) a top plate assembly, including a top electrically conductive electrode, (b) an o-ring, (c) an electrically insulating frit, (d) an electrically insulating spacer between a bottom surface of the top electrode and the o-ring and the frit, a membrane between the spacer and the frit, and a bottom plate assembly including a bottom electrically conductive electrode.

O-Ring Support

In a further embodiment, as depicted in FIG. 3A, FIG. 3B, FIG. 3C, and FIG. 3D, and FIG. 3E, the field flow fractionator further includes an o-ring support configured to hold the o-ring. In an embodiment, the o-ring support includes one of a polymer and a ceramic. In an embodiment, the o-ring support is one of a polymer and a ceramic. For example, the polymer could be acetal homopolymer. Also, the ceramic, for example, could be glass.

Alignment Pins

In a further embodiment, as depicted in FIG. 3A, FIG. 3B, FIG. 3C, FIG. 3D, and FIG. 3E, the field flow fractionator further includes at least one electrically insulating alignment pin configured to align the top plate assembly, the spacer, and the bottom plate assembly and configured to prevent the spacer from extruding under pressure. In an embodiment, the at least one electrically insulating alignment pin includes one of a polymer and a ceramic. In an embodiment, the at least one electrically insulating alignment pin is one of a polymer and a ceramic. For example, the polymer could be PEEK or an epoxy. Also, the ceramic, for example, could be glass.

Top Electrode

In an embodiment, the top electrode includes a self-passivating metal. In an embodiment, the top electrode is a self-passivating metal. In an embodiment, the self-passivating metal is one of titanium and nickel. In an embodiment, the top electrode further includes an electrically conductive material plated to a region of a bottom surface of the top electrode. In an embodiment, the electrically conductive material includes one of platinum, palladium, gold, chromium, and rhodium. In an embodiment, the electrically conductive material is one of platinum, palladium, gold, chromium, and rhodium.

In an embodiment, the top electrode includes a non-oxidizing metal. In an embodiment, the non-oxidizing metal is one of platinum, palladium, gold, chromium, and rhodium.

Frit

In an embodiment, the frit is one of a porous ceramic and a porous polymer. For example, the porous ceramic could be glass or aluminum silica ceramic. Also, the porous polymer, for example, could be PEEK or plastic.

Spacer

In an embodiment, the spacer is one of a laminated spacer (from laminated spacer patent), a polymer spacer, and a ceramic spacer. In an embodiment, the spacer is configured to electrically insulate the top plate assembly from the bottom plate assembly.

Bottom Electrode

In an embodiment, the bottom electrode includes a self-passivating metal. In an embodiment, the bottom electrode is a self-passivating metal. In an embodiment, the self-passivating metal is one of titanium and nickel. In an embodiment, the bottom electrode further includes an electrically conductive material plated to a region of a top surface of the bottom electrode. In an embodiment, the electrically conductive material includes one of platinum, palladium, gold, chromium, and rhodium. In an embodiment, the electrically conductive material is one of platinum, palladium, gold, chromium, and rhodium.

In an embodiment, the bottom electrode includes a non-oxidizing metal. In an embodiment, the non-oxidizing metal is one of platinum, palladium, gold, chromium, and rhodium.

Washers

Figure 4A:
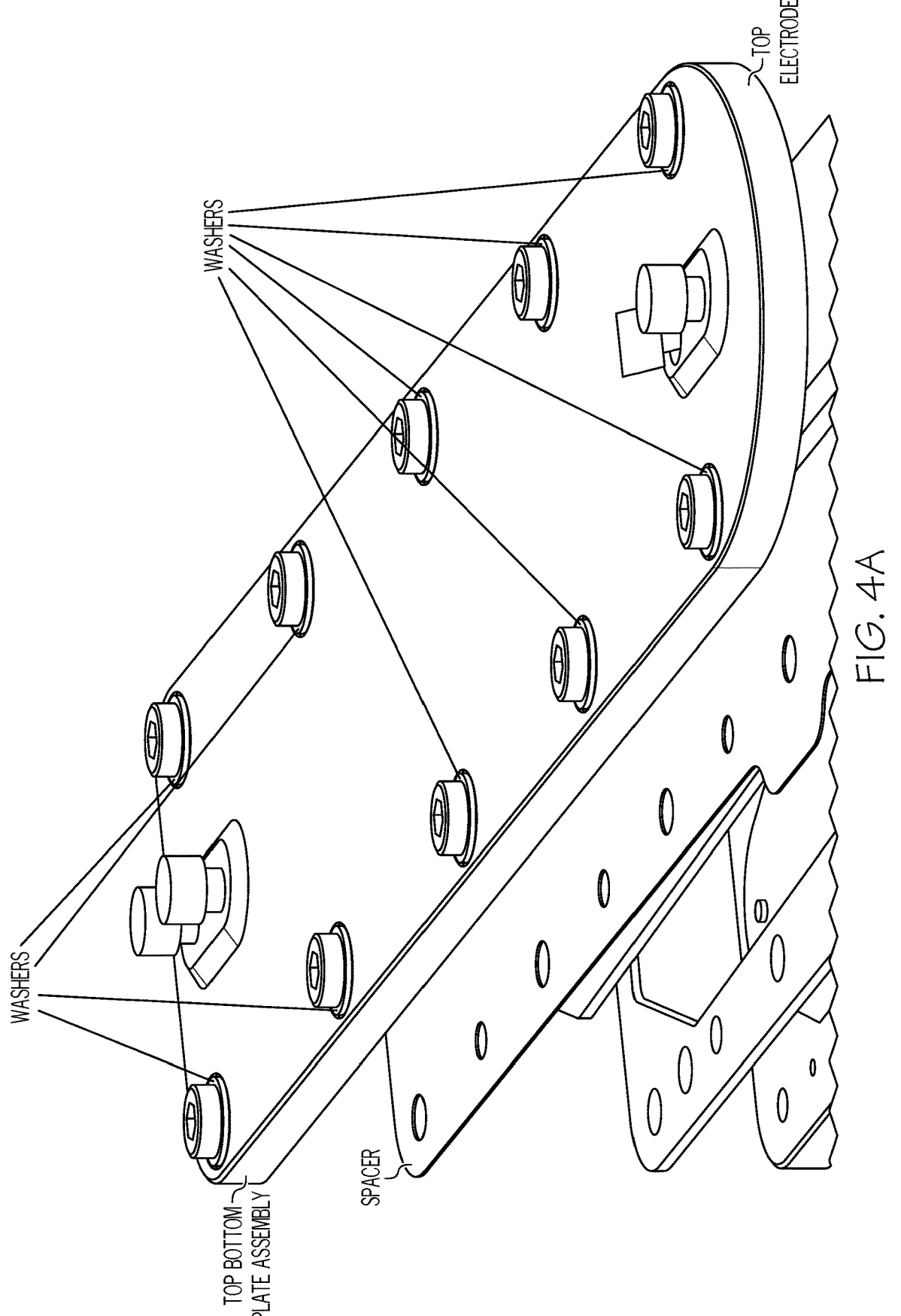
FIG. 4A depicts an apparatus in accordance with an exemplary embodiment.
Figure 4B:
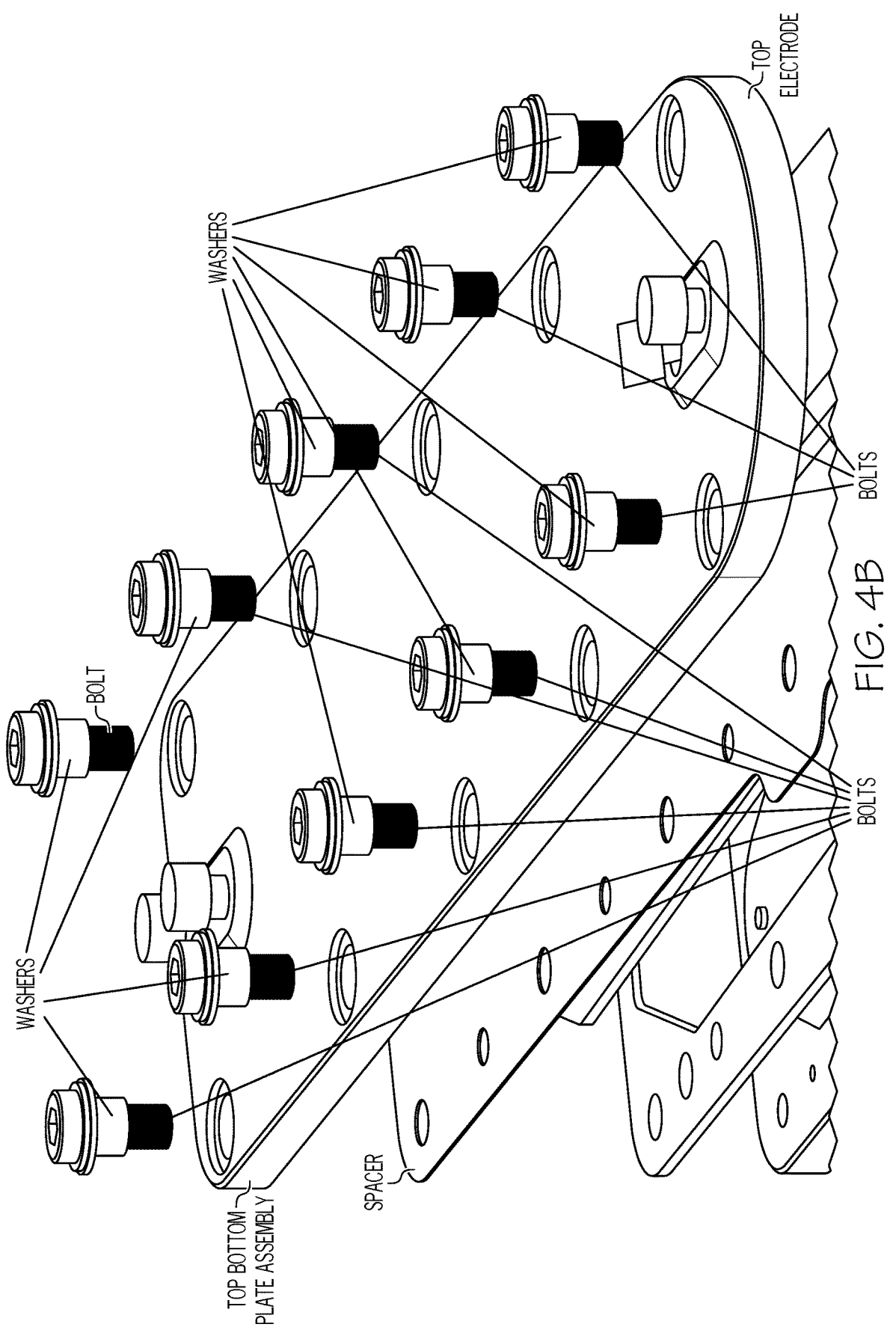
FIG. 4B depicts an apparatus in accordance with an exemplary embodiment.
Figure 4C:
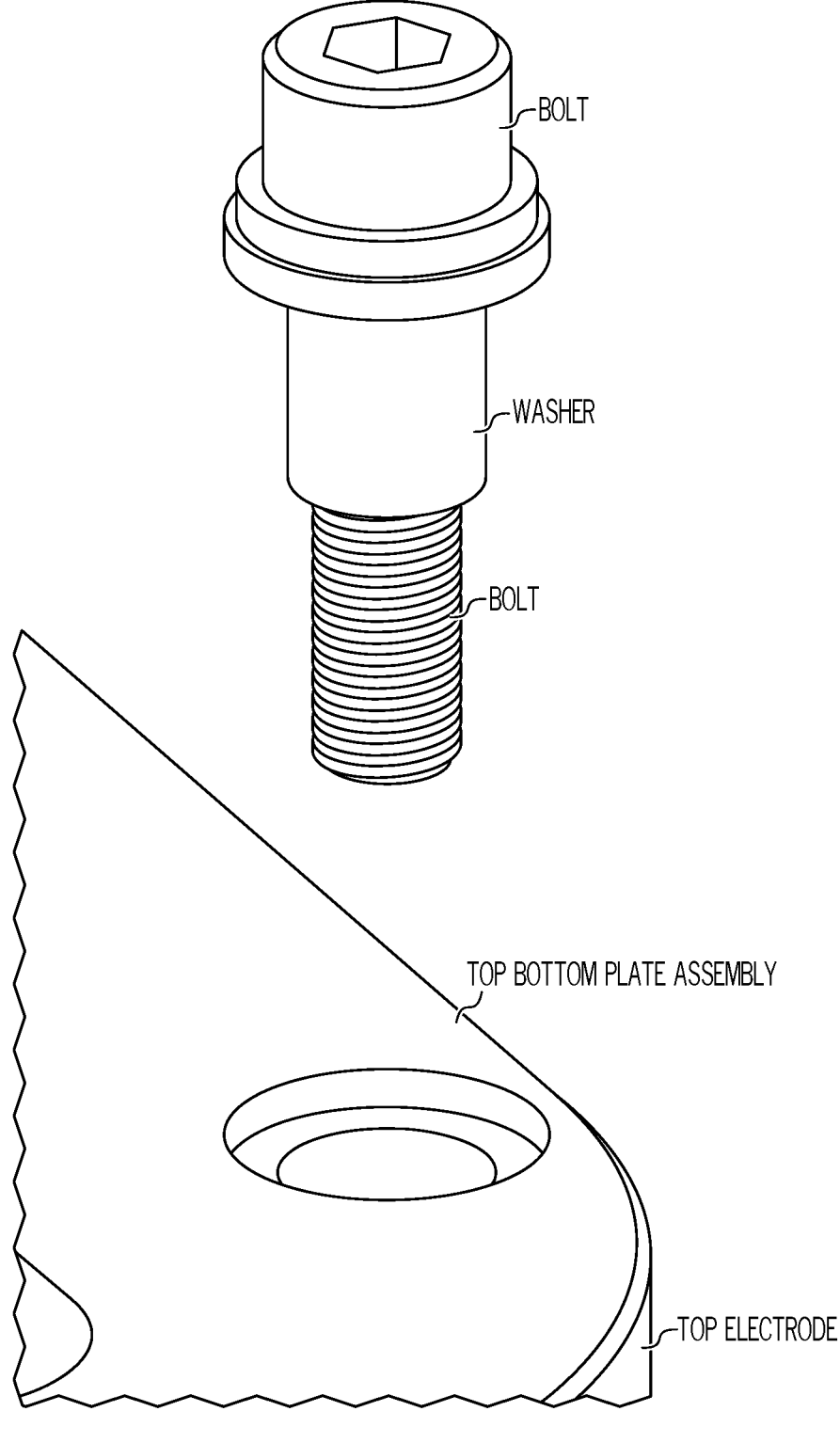
FIG. 4C depicts an apparatus in accordance with an exemplary embodiment.

In a further embodiment, as depicted in FIG. 4A, FIG. 4B, and FIG. 4C, the field flow fractionator further includes washers configured to electrically insulate bolts from the top plate assembly, where the bolts are configured to bolt the top plate assembly to the bottom plate assembly. In an embodiment, the washers include one of a glass-filled epoxy, a ceramic, and a polymer. In an embodiment, the washers are one of a glass-filled epoxy, a ceramic, and a polymer.

Bolts

Figure 3A:
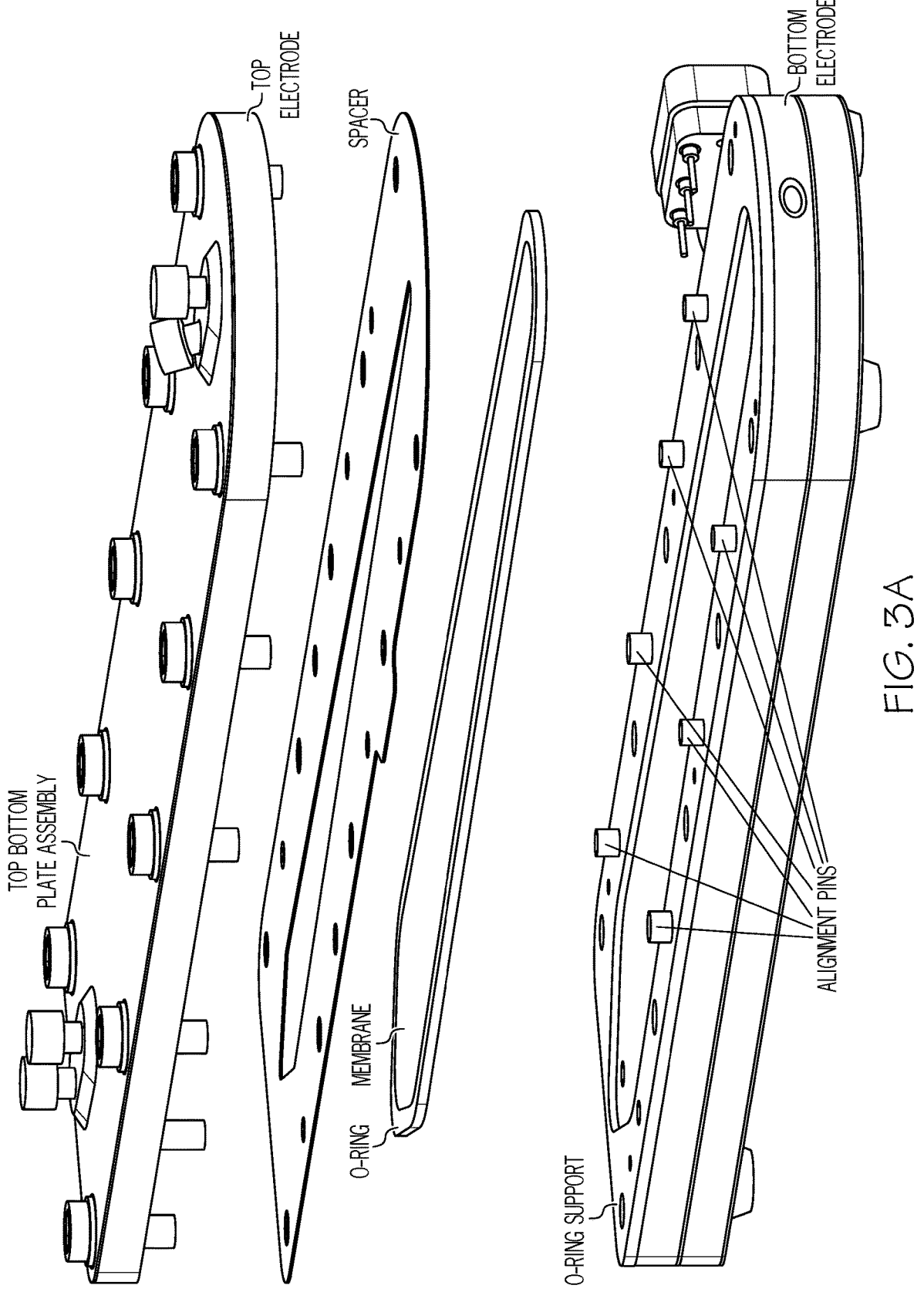
FIG. 3A depicts an apparatus in accordance with an exemplary embodiment.
Figure 3B:
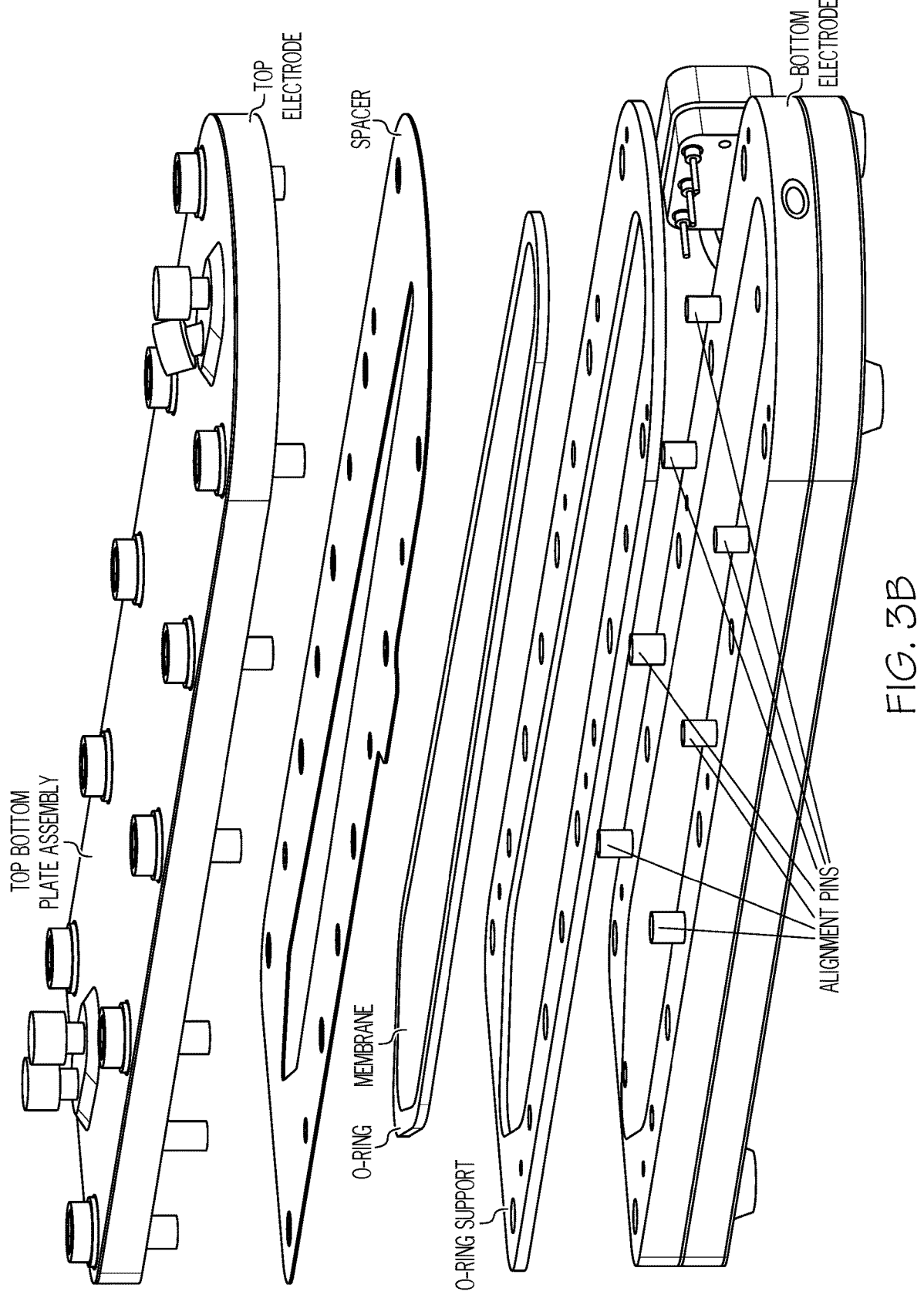
FIG. 3B depicts an apparatus in accordance with an exemplary embodiment.
Figure 3C:
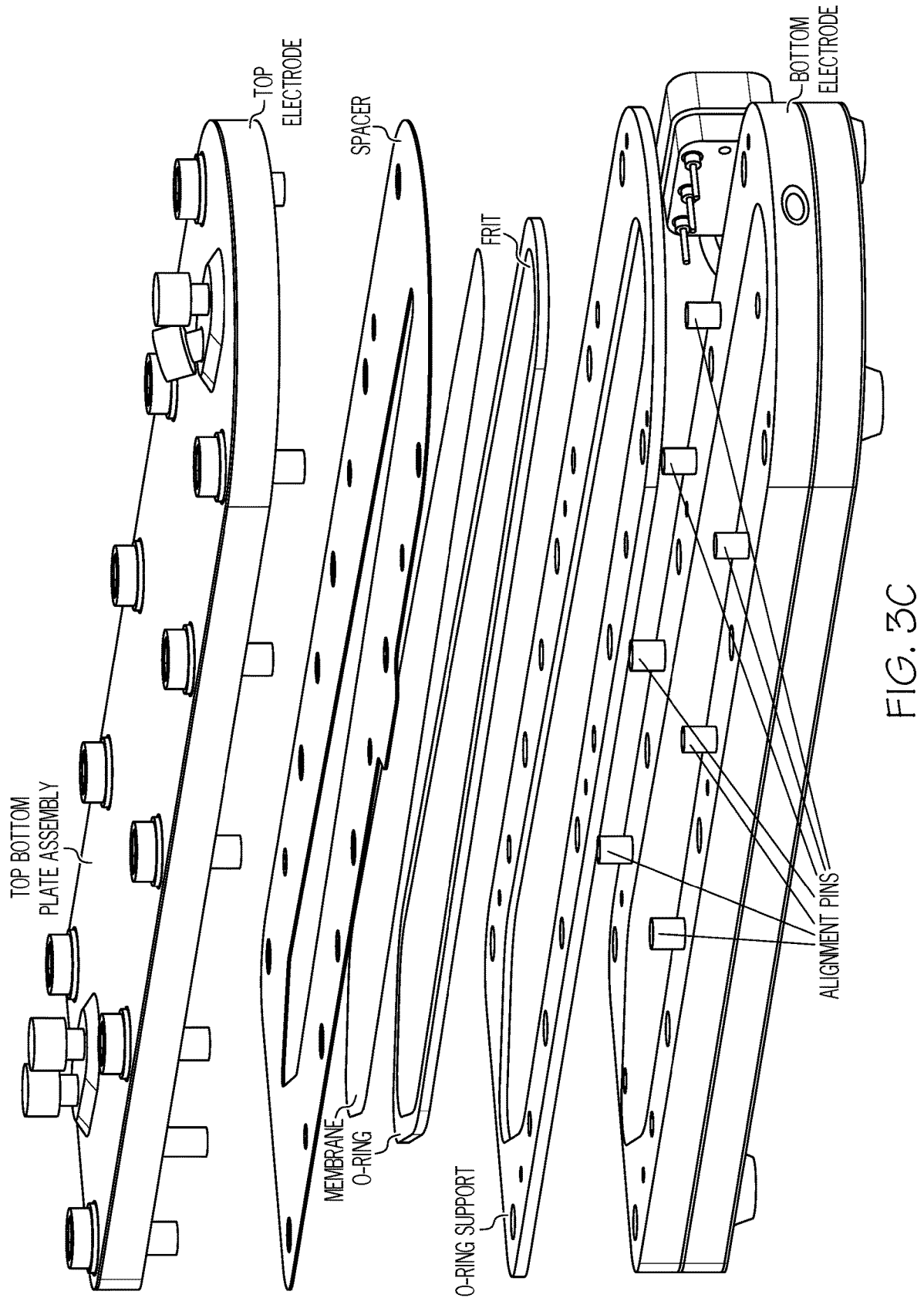
FIG. 3C depicts an apparatus in accordance with an exemplary embodiment.
Figure 3D:
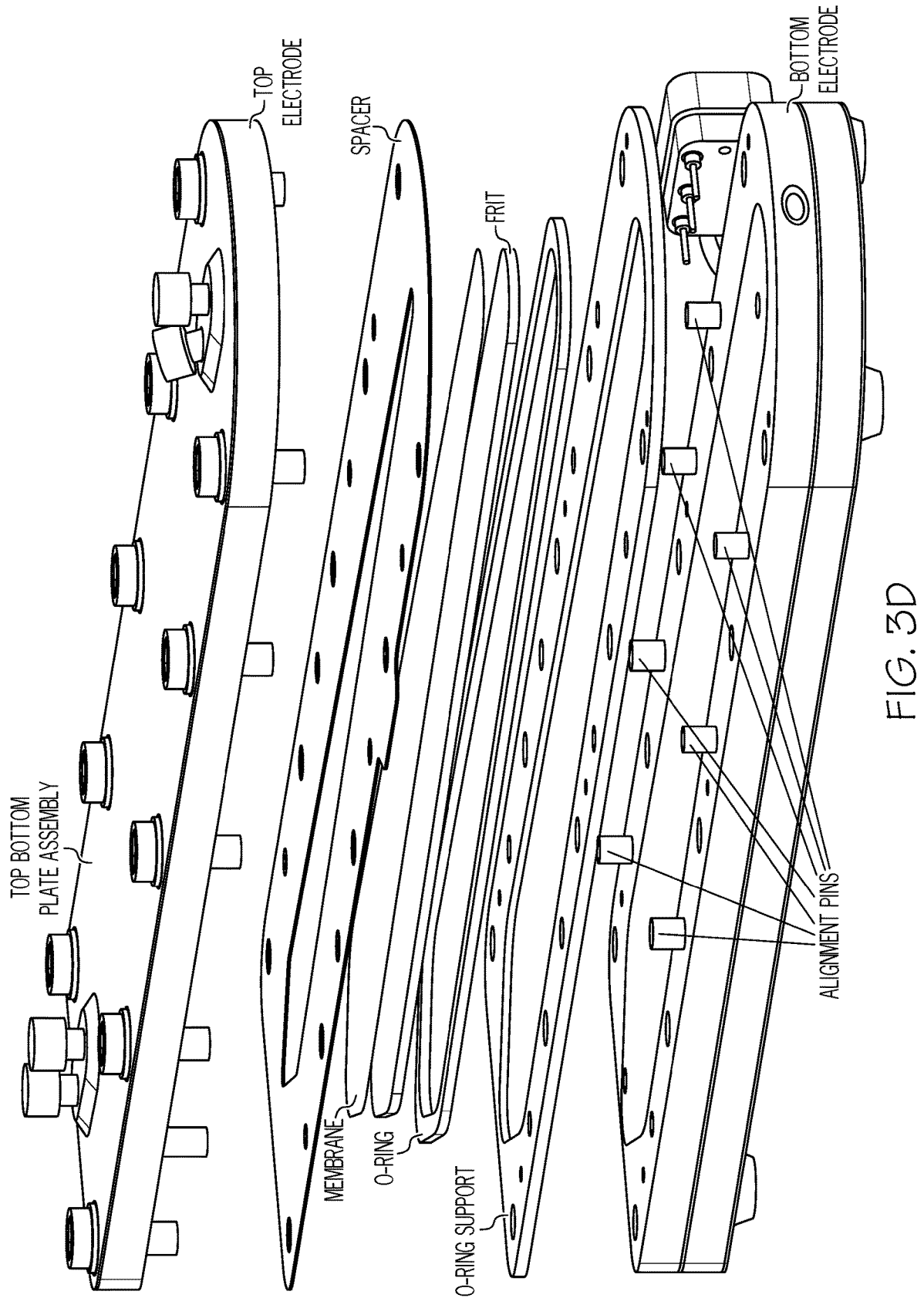
FIG. 3D depicts an apparatus in accordance with an exemplary embodiment.
Figure 3E:
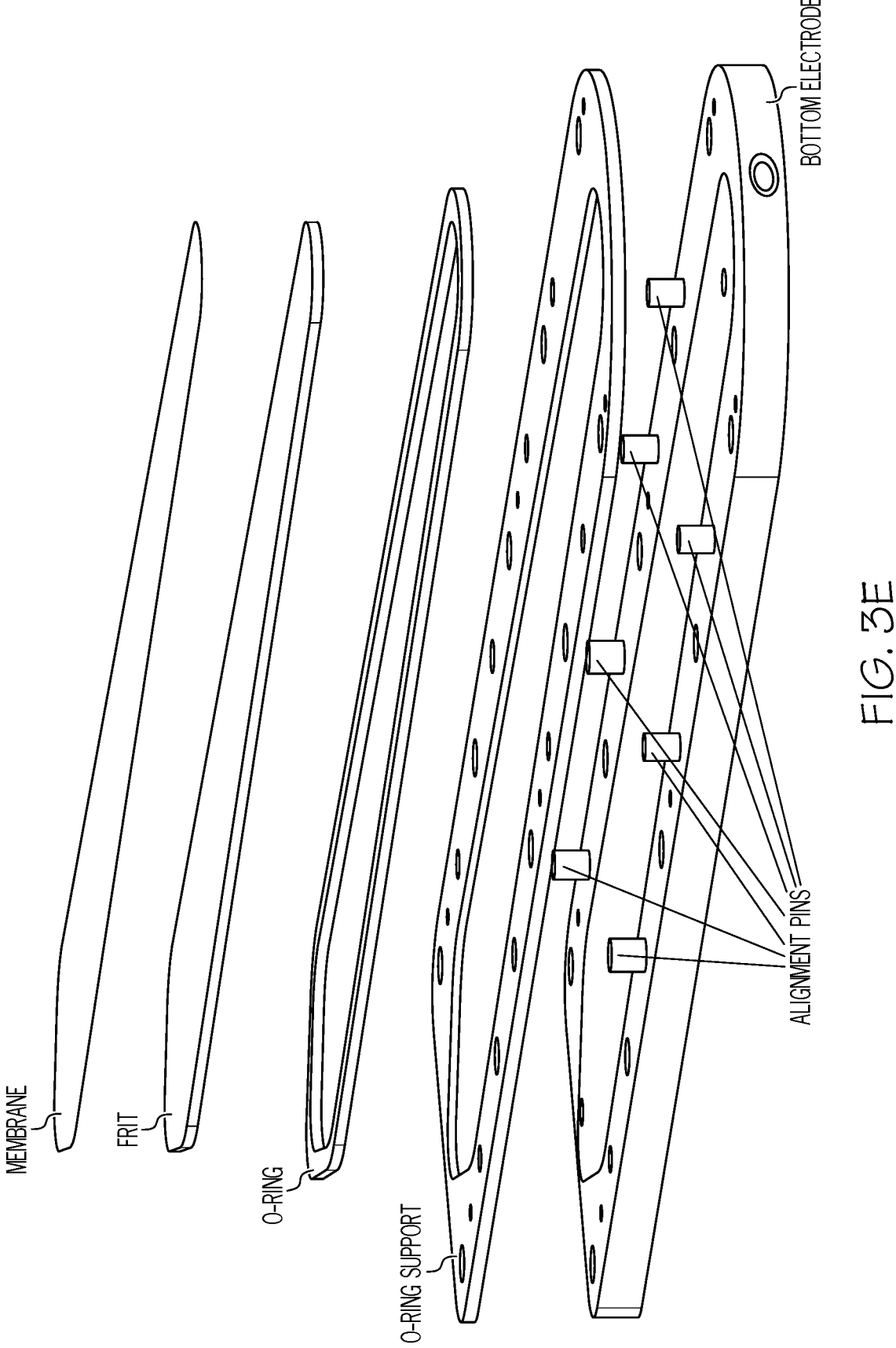
FIG. 3E depicts an apparatus in accordance with an exemplary embodiment.

In a further embodiment, as depicted in FIG. 3A, FIG. 3B, and FIG. 3C, the field flow fractionator further includes bolts configured to bolt the top plate assembly to the bottom plate assembly, where the bolts include one of a glass-filled epoxy, a ceramic, and a polymer. In a further embodiment, the field flow fractionator further includes bolts configured to bolt the top plate assembly to the bottom plate assembly, where the bolts are one of a glass-filled epoxy, a ceramic, and a polymer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A field flow fractionator comprising:
a top plate assembly comprising a top electrode, wherein the top electrode forms a top plate of the top plate assembly and includes a top electrically conductive surface;
an o-ring;
an electrically insulating frit;
an electrically insulating spacer between a bottom surface of the top electrode and the o-ring; and
a membrane between the spacer and the frit;
and a bottom plate assembly comprising
a bottom electrode,
wherein the bottom electrode forms a bottom plate of the bottom plate assembly and includes a bottom electrically conductive surface, wherein the top electrode and bottom electrode are each constructed and arranged to receive bolts for coupling the top electrode and the bottom electrode.

2. The field flow fractionator of claim 1, further comprising an o-ring support configured to hold the o-ring.

3. The field flow fractionator of claim 2, wherein the o-ring support comprises one of a polymer and a ceramic.

4. The field flow fractionator of claim 1, further comprising at least one electrically insulating alignment pin configured to align the top plate assembly, the spacer, and the bottom plate assembly and configured to prevent the spacer from extruding under pressure.

5. The field flow fractionator of claim 4, wherein the at least one electrically insulating alignment pin comprises one of a polymer and a ceramic.

6. The field flow fractionator of claim 1, wherein the top electrode comprises a self-passivating metal.

7. The field flow fractionator of claim 6, wherein the self-passivating metal includes one of titanium and nickel and excludes stainless steel.

8. The field flow fractionator of claim 6,
wherein the top plate assembly comprises an electrically conductive material plated to a region of a bottom surface of the top electrode.

9. The field flow fractionator of claim 8, wherein the electrically conductive material comprises one of platinum, palladium, gold, chromium, and rhodium.

10. The field flow fractionator of claim 1, wherein the top electrode comprises a non-oxidizing metal.

11. The field flow fractionator of claim 10, wherein the non-oxidizing metal is one of platinum, palladium, gold, chromium, and rhodium.

12. The field flow fractionator of claim 1, wherein the frit is one of a porous ceramic and a porous polymer.

13. The field flow fractionator of claim 1, wherein the spacer is one of a laminated space, a polymer spacer, and a ceramic spacer.

14. The field flow fractionator of claim 1, wherein the spacer is configured to electrically insulate the top plate assembly from the bottom plate assembly.

15. The field flow fractionator of claim 1, wherein the bottom electrode comprises a self-passivating metal.

16. The field flow fractionator of claim 15, wherein the self-passivating metal is one of titanium and nickel.

17. The field flow fractionator of claim 15, further comprising an electrically conductive material plated to a region of a top surface of the bottom electrode.

18. The field flow fractionator of claim 17, wherein the electrically conductive material comprises one of platinum, palladium, gold, chromium, and rhodium.

19. The field flow fractionator of claim 1, wherein the bottom electrode comprises a non-oxidizing metal.

20. The field flow fractionator of claim 19, wherein the non-oxidizing metal is one of platinum, palladium, gold, chromium, and rhodium.

21. The field flow fractionator of claim 1, further comprising washers configured to electrically insulate the bolts from the top plate assembly, wherein the bolts are configured to bolt the top plate assembly to the bottom plate assembly.

22. The field flow fractionator of claim 21, wherein the washers comprise one of a glass-filled epoxy, a ceramic, and a polymer.

23. The field flow fractionator of claim 1, further comprising the bolts configured to bolt the top plate assembly to the bottom plate assembly, wherein the bolts comprise one of a glass-filled epoxy, a ceramic, and a polymer.

* * * * *